(12) United States Patent
Nilsson

(10) Patent No.: US 10,783,662 B2
(45) Date of Patent: Sep. 22, 2020

(54) METHOD, A DEVICE, AND A SYSTEM FOR ESTIMATING A SUB-PIXEL POSITION OF AN EXTREME POINT IN AN IMAGE

(71) Applicant: Axis AB, Lund (SE)

(72) Inventor: Mikael Nilsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/437,513

(22) Filed: Jun. 11, 2019

(65) Prior Publication Data

US 2019/0378297 A1 Dec. 12, 2019

(30) Foreign Application Priority Data

Jun. 12, 2018 (EP) ..................................... 18177169

(51) Int. Cl.
*G06T 7/73* (2017.01)
*G06T 7/593* (2017.01)
*H04N 13/239* (2018.01)
*H04N 13/00* (2018.01)

(52) U.S. Cl.
CPC ................ *G06T 7/74* (2017.01); *G06T 7/593* (2017.01); *H04N 13/239* (2018.05);
(Continued)

(58) Field of Classification Search
CPC ........... G06T 7/593; G06T 2207/10012; G06T 2207/10016; G06T 2207/20004;
(Continued)

(56) References Cited

U.S. PATENT DOCUMENTS 4,945,351 A * 7/1990 Naiman .................... G06G 5/28
345/589
6,504,546 B1 * 1/2003 Cosatto .................... G06T 13/40
345/473
(Continued)

FOREIGN PATENT DOCUMENTS

EP 0987873 A2 3/2000
WO 91/020054 A1 12/1991

OTHER PUBLICATIONS

Woicke, Svenja et al.: "A stereo-vision hazard-detection algorithm to increase planetary lander autonomy" ACTA Astronautica, Pergamon Press, Elmsford, GB, vol. 122, Jan. 26, 2016, pp. 42-62.

*Primary Examiner* — Aklilu K Woldemariam
(74) *Attorney, Agent, or Firm* — Volpe and Koenig, P.C.

(57) ABSTRACT

A method for estimating a sub-pixel position of an extreme point in an image uses a parametric function. The parametric function is fitted locally to a group of neighboring pixels in the image, and a spatial position of an extreme point of the parametric function is identified. If the extreme point of the parametric function is of a different type than the extreme point in the image, or the position of the extreme point of the parametric function is located outside an area defined by the pixel positions in the group of neighboring pixels, a pixel is removed from the group of neighboring pixels and the fitting of the parametric function is repeated. In the end, the sub-pixel position is estimated as the position of the extreme point of the parametric function. A level of uncertainty of the estimated sub-pixel position is estimated as the number of repetitions needed before arriving at the estimate of the sub-pixel position.

15 Claims, 4 Drawing Sheets

(52) U.S. Cl.
CPC ........... *G06T 2207/10012* (2013.01); *G06T 2207/20004* (2013.01); *H04N 2013/0081* (2013.01)

(58) Field of Classification Search
CPC .. G06T 7/248; G06T 7/32; G06T 7/74; G06T 7/33; G06T 7/73; G06T 7/97; G06T 15/00; G06T 19/00; G06T 7/55; G06T 2207/10072; G06T 7/0012; G06T 17/20; G06T 9/001; G06T 7/20; G06T 15/20; H04N 2013/0081; H04N 13/239; H04N 19/105; H04N 19/139; H04N 13/189; H04N 13/383; A61B 5/103; A61B 5/1075; B33Y 50/00; G05B 2219/49023; G02B 27/0093; G02F 2001/133627; G06K 2209/05; G06K 9/00228; G06K 9/00268; G06K 9/00281; G06K 2009/4666; G09G 2320/02; G09G 5/393; G09G 3/2074; G02C 7/028
USPC ....... 345/418, 419, 420, 621, 473–475, 589; 382/236, 154, 254
See application file for complete search history.

(56) References Cited

U.S. PATENT DOCUMENTS

| | | | | |
|---|---|---|---|---|
| 6,912,293 B1* | 6/2005 | Korobkin | ............... | G06T 15/20 345/420 |
| 7,088,368 B1* | 8/2006 | Andrews | ............... | G06T 15/005 345/418 |
| 7,162,073 B1 | 1/2007 | Akgul et al. | | |
| 7,787,655 B1* | 8/2010 | Cohen | ............... | G06T 7/33 382/103 |
| 7,844,087 B2* | 11/2010 | Ray | ............... | G06K 9/4638 382/128 |
| 8,625,932 B2* | 1/2014 | Intwala | ............... | G06T 3/0012 382/254 |
| 9,761,020 B2* | 9/2017 | Prevrhal | ............... | G06T 11/006 |
| 2002/0057839 A1 | 5/2002 | Rinn et al. | | |
| 2002/0146178 A1* | 10/2002 | Bolle | ............... | G06K 9/00067 382/254 |
| 2004/0217956 A1* | 11/2004 | Besl | ............... | G06T 15/205 345/419 |
| 2005/0057574 A1* | 3/2005 | Andrews | ............... | G06T 15/005 345/592 |
| 2008/0044102 A1* | 2/2008 | Ekin | ............... | G06K 9/3266 382/276 |
| 2008/0240588 A1* | 10/2008 | Tsoupko-Sitnikov | ............... | H04N 19/85 382/236 |
| 2011/0286635 A1* | 11/2011 | Nishigaki | ............... | G06T 7/248 382/107 |
| 2015/0110359 A1 | 4/2015 | Kellomaki | | |

* cited by examiner

METHOD, A DEVICE, AND A SYSTEM FOR ESTIMATING A SUB-PIXEL POSITION OF AN EXTREME POINT IN AN IMAGE

TECHNICAL FIELD

The present invention relates to the field of estimating a sub-pixel position of an extreme point in an image. In particular, it relates to a method and associated devices and systems for estimating a sub-pixel position of an extreme point in an image using a parametric function.

BACKGROUND

Digital images are built up of a finite set of digital values, called pixels. These are the smallest individual elements in the image. Spatial positions in a digital image may be measured with a precision of a pixel. However, in some applications that it not enough, and there is a desire of measuring spatial positions in an image with a sub-pixel precision. For example, in many applications it is of great interest to estimate the position of an intensity maximum or minimum in an image with a sub-pixel precision. This includes applications within optical flow, object localization from, e.g., satellite or microscope images, and in stereo camera set-ups for estimating depth in a scene.

One method of estimating the position of a maximum or a minimum in an image includes fitting a parametric function locally to the pixel values of the image. A maximum or minimum of the fitted parametric function may then be identified, and the spatial position of the identified maximum or minimum of the parametric function may be taken as the sub-pixel position of the maximum or minimum in the image. A drawback with this method is that it is sensitive to noise in the image. Also it provides no measure of how reliable the estimation is. There is thus room for improvements.

SUMMARY OF THE INVENTION

In view of the above, an improved estimation of a sub-pixel position of a maximum or a minimum in an image is desired.

According to a first aspect, a method, performed in a device, comprises estimating a sub-pixel position of an extreme point in an image in the presence of noise using a parametric function, the extreme point in the image being of a type which is either a maximum or a minimum, the method comprising:

a) selecting a group of neighboring pixels in the image, wherein a number of pixels in the group of neighboring pixels is larger than a number of parameters defining the parametric function, b) fitting the parametric function to pixel values of the group of neighboring pixels, wherein the parametric function approximates the pixel values of the group of neighboring pixels as a function of spatial position, c) identifying a spatial position of an extreme point of the parametric function, the extreme point of the parametric function being of a type which is a maximum, a minimum, or a saddle point, d) checking whether the extreme point of the parametric function is of the same or a different type than the extreme point in the image, and whether the position of the extreme point of the parametric function is located inside or outside of an area defined by pixel positions of the group of neighboring pixels in the image, and if the extreme point of the parametric function is of a different type than the extreme point in the image or the position of the extreme point of the parametric function is located outside said area:

removing a pixel from the group of neighboring pixels, and repeating steps b), c) and d) if the number of pixels in the group of neighboring pixels is still larger than, or equal to, the number of parameters defining the parametric function, e) estimating the sub-pixel position of the extreme point in the image as the spatial position of the extreme point of the parametric function, and f) associating the estimated sub-pixel position with a level of uncertainty corresponding to a number of iterations of steps b), c) and d).

According to this method, a parametric function is thus fitted locally to pixel values of a group of neighboring pixels of the image and an extreme point of the parametric function is identified. However, before accepting the spatial position of the identified extreme point of the parametric function as an estimate of the sub-pixel position of the extreme point in the image, two checks are made.

In a first check, it is checked whether the identified extreme point of the parametric function is of the same type or a different type as the extreme point in the image that we are looking for. For example, when looking for a sub-pixel position of a maximum in the image, it is checked whether the identified extreme point of the parametric function is a maximum or not. Similarly, when looking for a sub-pixel position of a minimum in the image, it is checked whether the identified extreme point of the parametric function is a minimum or not. The reason for doing this first check is that noise in the image may give rise to outlying pixel values. The outlying pixel values may, in turn, result in a poor fit of the parametric function. In the end, the result may be that the parametric function has a minimum even though the method searches for a maximum, and vice versa.

In a second check, it is checked whether the identified extreme point of the parametric function is located inside or outside of an area defined by pixel positions of the group of neighboring pixels in the image. Again, outlying pixel values may give rise to a poor fit of the parametric function, causing the identified extreme point to be outside of the local neighborhood in which the method searches for a maximum or minimum.

Any of the first and the second check fails if the identified extreme point of the parametric function is of a different type than the extreme point in the image, or if the identified extreme point of the parametric function is located outside of the area defined by the group of neighboring pixels. If that happens, the method proceeds to remove a pixel from the group of neighboring pixels and starts again with fitting a parametric function to the pixel values of the group of neighboring pixels. This is repeated until both checks pass, or until there are not enough pixel values left in the group of neighboring pixels to allow the parametric function to be fitted. The method thus allows for iteratively removing potentially outlying pixel values until an acceptable fit has been obtained. In this way, the method becomes more robust to noise in the image.

The number of iterations required is typically related to the level of noise in the image—the noisier the image, the more iterations are typically needed to achieve an acceptable fit. Further, the fit of the parametric function will be based on less pixel values for each iteration. Accordingly, the level of uncertainty of the estimated sub-pixel position tend to increase with the number of iterations. Therefore, the method proposes to use the number of iterations as a measure of the level of uncertainty of the estimated sub-pixel position, i.e., as a measure of how reliable the estimation is.

By an image is generally meant any kind of spatially organized signal values. The image may be an image captured by a sensor, such as a visual light image, an infrared image, or a thermal image. However, the image may more generally be any measured or calculated signal values which are provided on a two-dimensional grid. These signal values may be spatially related, such as being spatially correlated.

The image comprises pixels. Each pixel is associated with a position, corresponding to the position of the pixel on the two-dimensional grid. Each pixel is further associated with a pixel value, corresponding to the signal value of the pixel.

The pixel positions thus define discrete positions arranged in a two-dimensional grid. Spatial positions in two-dimensional space which are not restricted to these discrete positions are referred to herein as sub-pixel positions.

By an extreme point in an image is typically meant a maximum or a minimum in the image. The maximum may be a local maximum. The minimum may be a local minimum.

By an extreme point of a parametric function is typically meant a stationary point of the parametric function, i.e., a point where all partial derivatives (or equivalently the gradient) of the parametric function are zero. The extreme point of the parametric function may be a maximum, a minimum, or a saddle point.

By a level of uncertainty of an estimate is generally meant a measure of how reliable the estimate is. A lower level of uncertainty indicates a more reliable estimate than ha higher level of uncertainty. The level of uncertainty is also indicative of the variance of the estimate. A higher level of uncertainty indicates a higher variance than a lower level of uncertainty.

The group of neighboring pixels may be selected based on the pixel values of the image. For example, regions in the image where the pixel values indicate the presence of a local maximum (if the type of extreme point is a maximum) or a local minimum (if the type of extreme point is a minimum) may be identified. The group of neighboring pixels may be selected to include such a region. In this way, a coarse estimate of the position of the extreme point is first made using the pixel values of the image. The method described above may then be used to fine tune the estimated position of the extreme point to a sub-pixel precision. A pixel in the image having a pixel value which is greater than the pixel values of each of its neighboring pixels indicates the presence of a local maximum. Similarly, a pixel in the image having a pixel value which is lower than the pixel values of each of its neighboring pixels indicates the presence of a local minimum. Therefore, if the extreme point in the image is a maximum, the group of neighboring pixels may be selected to include a pixel in the image having a pixel value which is greater than a pixel value of each neighboring pixel in the image, and if the extreme point in the image is a minimum, the group of neighboring pixels is selected to include a pixel in the image having a pixel value which is lower than a pixel value of each neighboring pixel in the image. The group of neighboring pixels may be selected to be centered about the pixel having the greatest pixel value (if a maximum is searched for) or about the pixel having the lowest pixel value (if a minimum is searched for). For example, the group of neighboring pixels may include a 3×3 pixel neighborhood centered about the pixel having the greatest pixel value (if a maximum is searched for), or about the pixel having the lowest pixel value (if a minimum is searched for).

The parametric function may be a two-dimensional quadratic function. Such a function may be written on the following parametric form:

$$f(x,y)=Ax^2+By^2+Cxy+Dx+Ey+F.$$

The two-dimensional quadratic function is described by six parameters. Hence, the parametric function may be fitted to the pixel values of the group of neighboring pixels as long as there are at least six pixels in the group of neighboring pixels. This parametric function is advantageous in that it may be fitted to the pixel values of the group of neighboring pixels using closed form expressions. It is therefore a computationally efficient choice. However, it is to be understood that other parametric functions may be used while still achieving that advantage.

The parametric function may be fitted to the pixel values of the group of neighboring pixels using a least-squares method. This includes minimizing the sum of squared differences between the pixel values of the group of neighboring pixels and the parametric function evaluated at the positions of the pixels of the group of neighboring pixels. This is a computationally efficient approach of fitting the parametric function to the pixel values of the group of neighboring pixels, even when the number of pixels in the group of neighboring pixels exceeds the number of parameters in the parametric function.

The fit of the parametric function to the pixel values of the group of neighboring pixels may involve solving a system of equations to find the parameters defining the parametric function. The system of equations may be defined by, for each pixel in the group, equating the value of the pixel with the value of the parametric function evaluated at the position of the pixel. A solution to the system may be found, for example by using the least-squares method previously described. Solving the system of equations may include forming linear combinations of pixel values of the group of neighboring pixels to find the parameters defining the parametric function. In order to make the method computationally efficient, coefficients of the linear combinations may be pre-stored in the device. In this way, the coefficients are evaluated beforehand and need not be evaluated each time the method is performed.

As explained above, the method iteratively removes pixels from the group of neighboring pixels until an acceptable fit of the parametric function is achieved. In particular, a pixel which may be considered as an outlier may be removed. In this way, the impact of noise on the fitting may be reduced. This may be done in different ways. For example, in step d), the pixel having a pixel value which deviates most from an average formed from the pixel values of the group of neighboring pixels may be removed. The average may in some cases be calculated by omitting the pixel value of a center pixel of the group of neighboring pixels. This is motivated by the fact that the center pixel typically is chosen as the pixel having the largest (if maximum) or lowest (if minimum) pixel value. In that way, the average will reflect an average of the pixels surrounding the center pixel.

The proposed method not only provides an estimate of the sub-pixel position, but also provides a level of uncertainty of the estimate. The level of uncertainty is given in terms of the number of iterations required in order to pass the two checks defined in step d). The level of uncertainty reflects how reliable the estimate is, the reliability increasing with decreasing level of uncertainty. The level of uncertainty is therefore a measure of how much an estimate of the sub-pixel position can be trusted. Knowledge of the level of uncertainty can be used in further processing of the estimated sub-pixel positions. More specifically, the method may further comprise: processing the estimated sub-pixel position, wherein the level of uncertainty associated with the estimated sub-pixel position is used to weight the estimated sub-pixel position, or a quantity calculated therefrom, during the processing, wherein a higher level of uncertainty corresponds to a lower weight than a lower level of uncertainty. In this way, an estimated sub-pixel position, or a quantity calculated therefrom, may be weighted in accordance with its reliability. Accordingly, the impact of noise may be reduced during the processing.

The proposed method may be used for a variety of applications including object localization from, e.g., satellite or microscope images. In such applications, the image which is input to the method may be captured by a sensor. For example, the image may be a visual light image, an infrared image, or a thermal image. However, in another group of applications, the image instead corresponds to calculated signal values which are provided on a two-dimensional grid.

An example of such an application is related to object detection. In such an application, the image signal values may correspond to scores which are output from an object detector. A score may reflect the probability that an object is present at a pixel location in the image. By applying the proposed method to an image with scores from an object detector, the position of an object in an image may be determined with a sub-pixel precision. The processing of the determined sub-pixel position may correspond to smoothing of the position using the level of uncertainty as a weight.

Another example of such an application is related to stereo cameras. In a stereo camera, a first sensor and a second each capture an image of a scene, but from slightly different viewing angles. By finding matching features in the two images, one may for instance calculate the depth in the scene, i.e., the distance to objects in the scene. The proposed method may be used in the process of matching features between a first image and a second image in a stereo pair of images. In particular, it can be used to find the position of matching features with sub-pixel precision and with an associated level of uncertainty.

In a stereo application, the image which is input to the proposed method may correspond to a correlation map. The correlation map may be generated by matching (e.g., correlating) pixel values in a neighborhood of a pixel in a first image of a stereo pair of images with pixel values in a second image of the stereo pair of images. The correlation map is hence defined on a two-dimensional grid corresponding to the pixel positions in the second image. Further, the signal values of the correlation map indicate how well the value of a specific pixel in the first image matches with the pixel values of the second image. When the proposed method is used with the correlation map as an input, the sub-pixel position of the extreme point in the image hence corresponds to a sub-pixel position in the second image that gives a best match to the pixel in the first image.

This approach hence estimates the sub-pixel position in the second image, and an associated level of uncertainty, that gives a best match to a specific pixel in the first image in the stereo pair. This procedure may be repeated for a plurality of pixels in the first image of the stereo pair. More specifically, the method may further comprise, for each of a plurality of pixels in the first image of the stereo pair of images: generating a correlation map corresponding to the pixel by matching pixel values in a neighborhood of the pixel with pixel values in the second image, performing steps a)-f) for the correlation map corresponding to the pixel so as to estimate a sub-pixel position in the second image that gives a best match to the pixel, the sub-pixel position in the second image being associated with a level of uncertainty. In this way, a sub-pixel position in the second image, and an associated level of uncertainty, is estimated for each of the plurality of pixels in the first image.

The plurality of pixels may correspond to all pixels in the first image. The plurality of pixels may correspond to a specified area in the first image. Alternatively, or additionally, the plurality of pixels in the first image of the stereo pair of image may depict the same object in the scene.

The method may further comprise processing the estimated sub-pixel positions corresponding to the plurality of pixels in the first image of the stereo pair of images. The level of uncertainty associated with the estimated sub-pixel positions may be used as weights during the processing, wherein a quantity calculated from a sub-pixel position associated with a higher level of uncertainty is given a lower weight than a quantity calculated from a sub-pixel position associated with a lower level of uncertainty. In this way, less reliable matches between the first and the second image may be given a lower weight than more reliable matches. In this way, the impact of noise may be reduced.

The quantity calculated from a sub-pixel position may include a disparity value which is calculated as a difference between the sub-pixel position and a position of a corresponding pixel in the first image. Accordingly, different disparity values may be given different weights in accordance with their reliability. This will in the end reduce the impact of noise. For example, the processing may include calculating a weighted average of disparity values calculated from the estimated sub-pixel positions, wherein disparity values calculated from sub-pixel positions associated with a higher level of uncertainty are given a lower weight than disparity values calculated from sub-pixel positions associated with a lower level of uncertainty. This may, for instance, be useful in connection to smoothing disparity maps.

The quantity calculated from a sub-pixel position may include a depth value which is calculated based on the sub-pixel position and a position of a corresponding pixel in the first image, wherein the depth value corresponds to a distance to an object in the scene depicted by the pixel in the first image. Accordingly, different depth values may be given different weights in accordance with their reliability. This will in the end reduce the impact of noise. For example, the processing of the estimated sub-pixel positions corresponding to the plurality of pixels in the first image of the stereo pair of images may include, for each of the plurality of pixels in the first image of the stereo pair of images: calculating a depth value of the pixel based on the position of the pixel in the first image and the sub-pixel position in the second image that gives a best match to the pixel, and associating the depth value with the level of uncertainty associated with the sub-pixel position in the second image. In this way, the calculated depth values may be associated with a level of uncertainty, thereby providing a measure of how reliable the depth values are. The level of uncertainty associated with the depth values may be used when processing the depth values. For example, a higher weight may be given to depth values having a lower level of uncertainty compared to depth values having a higher level of uncertainty.

The processing may further include: calculating a weighted average of the depth values corresponding to the plurality of pixels in the first image of the stereo pair of images, wherein depth values calculated from sub-pixel positions having a higher level of uncertainty are given a lower weight than depth values calculated from sub-pixel positions having a lower level of uncertainty. In this way, the depth values are weighted according to their reliability. In this way, the impact of noise in the depth values is reduced. This may, for instance, be used when calculating a depth to a specified area of the image. This may also be useful for the purpose of smoothing a depth map. The more reliable depths values will then have a higher impact on the end result than less reliable depth values.

The weighted average of the depth values may be calculated by applying a spatial filter to the depth values corresponding to the plurality of pixels in the first image of the stereo pair of images. The spatial filter may be a smoothing filter which smooths the depth values. The parameters of the spatial filter may be set depending on the levels of uncertainty.

The quantity calculated from a sub-pixel position may include a point in three-dimensional space, wherein the point in three-dimensional space is calculated based on the sub-pixel position and a position of a corresponding pixel in the first image. Accordingly, different points in three-dimensional space may be given different weights in accordance with their reliability. This will in the end reduce the impact of noise.

In some applications, it is of interest to estimate the shape of a three-dimensional object in the scene based on a pair of stereo images depicting the scene. This may be achieved by identifying a plurality of pixels which depict the object in a first of the stereo images, calculating points in three-dimensional space corresponding to the plurality of pixels based on the result of a stereo matching with a second of the stereo images, and fitting an object template to the calculated points in three-dimensional space. By using the proposed method, the level of uncertainty of the estimates may be used as weights in the process of fitting the object template, thereby making the fit less sensitive to noise. In more detail, the plurality of pixels in the first image of the stereo pair of images may depict the same object in the scene, and the processing may further comprise:

calculating a plurality of points in three-dimensional space corresponding to the plurality of pixels in the first image of the stereo pair of images, each point in three-dimensional space being calculated using the position of the corresponding pixel in the first image and the sub-pixel position in the second image that gives a beset match to the pixel in the first image, fitting a three-dimensional object template to the plurality of points in three-dimensional space, the three-dimensional object template defining an outline of an object being of the same type as the object in the scene, wherein, in the step of fitting the three-dimensional object template, a point in three-dimensional space calculated from a sub-pixel position with a higher level of uncertainty is given a lower weight than a point in three-dimensional space calculated from a sub-pixel position with a lower level of uncertainty.

According to a second aspect, a device for estimating a sub-pixel position of an extreme point in an image in the presence of noise using a parametric function, the extreme point in the image being of a type which is either a maximum or a minimum, comprises a processor configured to:

a) select a group of neighboring pixels in the image, wherein a number of pixels in the group of neighboring pixels is larger than a number of parameters defining the parametric function, b) fit the parametric function to pixel values of the group of neighboring pixels, c) identify a position of an extreme point of the parametric function, the extreme point of the parametric function being of a type which is a maximum, a minimum, or a saddle point, d) check whether the extreme point of the parametric function is of the same or a different type than the extreme point in the image, and whether the position of the extreme point of the parametric function is located inside or outside of an area defined by pixel positions of the group of neighboring pixels in the image, and if the extreme point of the parametric function is of a different type than the extreme point in the image or the position of the extreme point of the parametric function is located outside said area:

removing a pixel from the group of neighboring pixels, and repeating steps b), c) and d) if the number of pixels in the group of neighboring pixels is still larger than, or equal to, the number of parameters defining the parametric function, e) estimate the sub-pixel position of the extreme point in the image as the position of the extreme point of the parametric function, and f) associate the estimated sub-pixel position with a level of uncertainty corresponding to a number of iterations of steps b), c) and d).

According to a third aspect, there is provided a stereo camera system comprising:

a first image sensor configured to capture a first image of a stereo pair of images, a second image sensor configured to capture a second image of the stereo pair of images, a device according to the second aspect, and a processor configured to:

generate a correlation map from the stereo pair of images by matching pixel values in a neighborhood of a pixel in the first image with pixel values in the second image of the stereo pair of images, and provide the correlation map as input to the device, such that the device is caused to estimate a sub-pixel position of an extreme point in the correlation map in the presence of noise using a parametric function.

According to a fourth aspect, there is provided a non-transitory computer-readable medium comprising computer code instructions adapted to perform the method of the first aspect when executed by a device having processing capability.

The second, third, and fourth aspects may generally have the same features as the first aspect. It is further noted that all combinations of features are possible unless explicitly stated otherwise. The steps of any method disclosed herein do not have to be performed in the exact order disclosed, unless explicitly stated.

BRIEF DESCRIPTION OF THE DRAWINGS

The above, as well as additional features will be better understood through the following illustrative and non-limiting detailed description of embodiments of the invention, with reference to the appended drawings, where the same reference numerals will be used for similar elements, wherein.

DETAILED DESCRIPTION OF EMBODIMENTS

The present teachings will now be described more fully hereinafter with reference to the accompanying drawings, in which embodiments of the invention are shown. This teachings may, however, be embodied in many different forms and should not be construed as limited to the embodiments set forth herein; rather, these embodiments are provided for thoroughness and completeness, and to fully convey the scope of the invention to the skilled person. The systems and devices disclosed herein will be described during operation.

Figure 1:
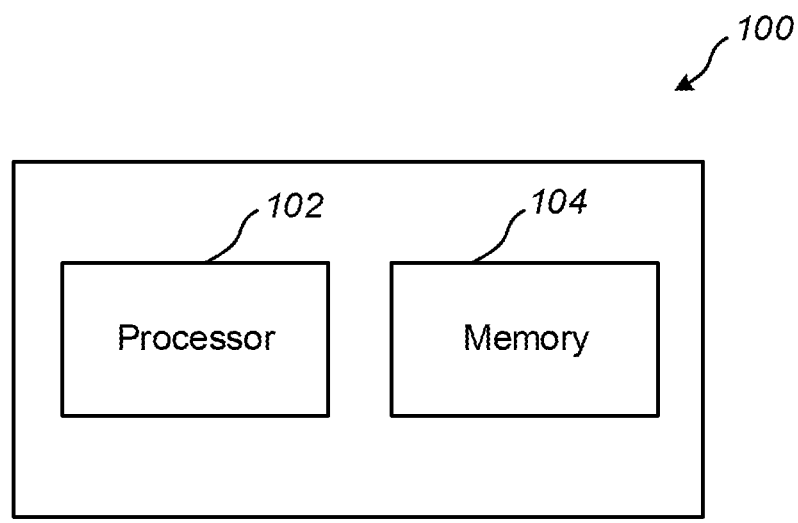
FIG. 1 illustrates a device for estimating a sub-pixel position of an extreme point in an image according to embodiments.

FIG. 1 illustrates a device 100 for estimating a sub-pixel position of an extreme point in an image. The device 100 includes a processor 102. The processor may be of any known type, such as a central processing unit, a microprocessor, a digital signal processor or the like. The device 100 further includes a memory 104. The memory 104 may be a non-transitory computer-readable medium, such as a non-volatile memory. Computer code instructions may be stored in the memory 104. When the computer code instructions are executed by the processor 102, the processor 102 is caused to performed any method disclosed herein. In particular, it is caused to perform a method for estimating a sub-pixel position of an extreme point in an image which is input to the device 100.

Figure 2:
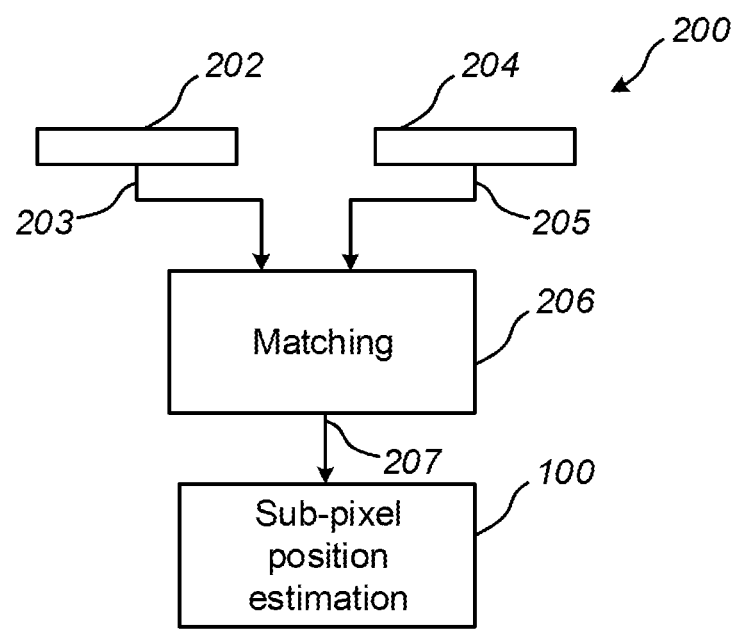
FIG. 2 illustrates a stereo camera system according to embodiments.

FIG. 2 illustrates a system 200 in which the device 100 may be used. The system 200 is a stereo camera system 200. The system 200 comprises a first image sensor 202, a second image sensor 204, a matching component 206, and the device 100 of FIG. 1 for estimating a sub-pixel position of an extreme point in an image.

The first image sensor 202 and the second image sensor 204 are arranged to simultaneously capture images of a scene from different viewing angles. A first image 203 captured by the first sensor 202 and a second image 205 captured by the second sensor 204 form a stereo pair of images. The first and second image sensors 202, 204 may be the image sensors of any known stereo camera. For example, they may be part of an AXIS P8804 Stereo Sensor Kit.

The first and second image sensors 202, 204 are operatively connected to the matching component 206. Particularly, the first image 203 and the second image 205 captured by the first and second sensors 202, 204 are provided as input to the matching component 206. The matching component 206 comprises a processor. The processor may be of any known type, such as a central processing unit, a microprocessor, a digital signal processor or the like. The matching component 206 may further comprise a memory which may be a non-transitory computer-readable medium, such as a non-volatile memory. The memory of the matching component 206 may store computer code instructions. When these computer code instructions are executed by the processor of the matching component 206, the processor is caused to match pixel values in the first image 203 to pixel values in the second image 205 so as to generate and output a correlation map 207.

The matching component 206 is operatively connected to the device 100. In particular, the correlation map 207 generated by the matching component 206 is input to the device 100. Accordingly, the device 100 is arranged to estimate a sub-pixel position of an extreme point in the correlation map.

The matching component 206 may be integrated in the device 100. In particular, the processor 102 and the memory 104 may be configured to both match pixel values in the first and second images 203, 205 to generate a correlation map, and subsequently estimate a sub-pixel position of an extreme point in the correlation map.

Figure 3:
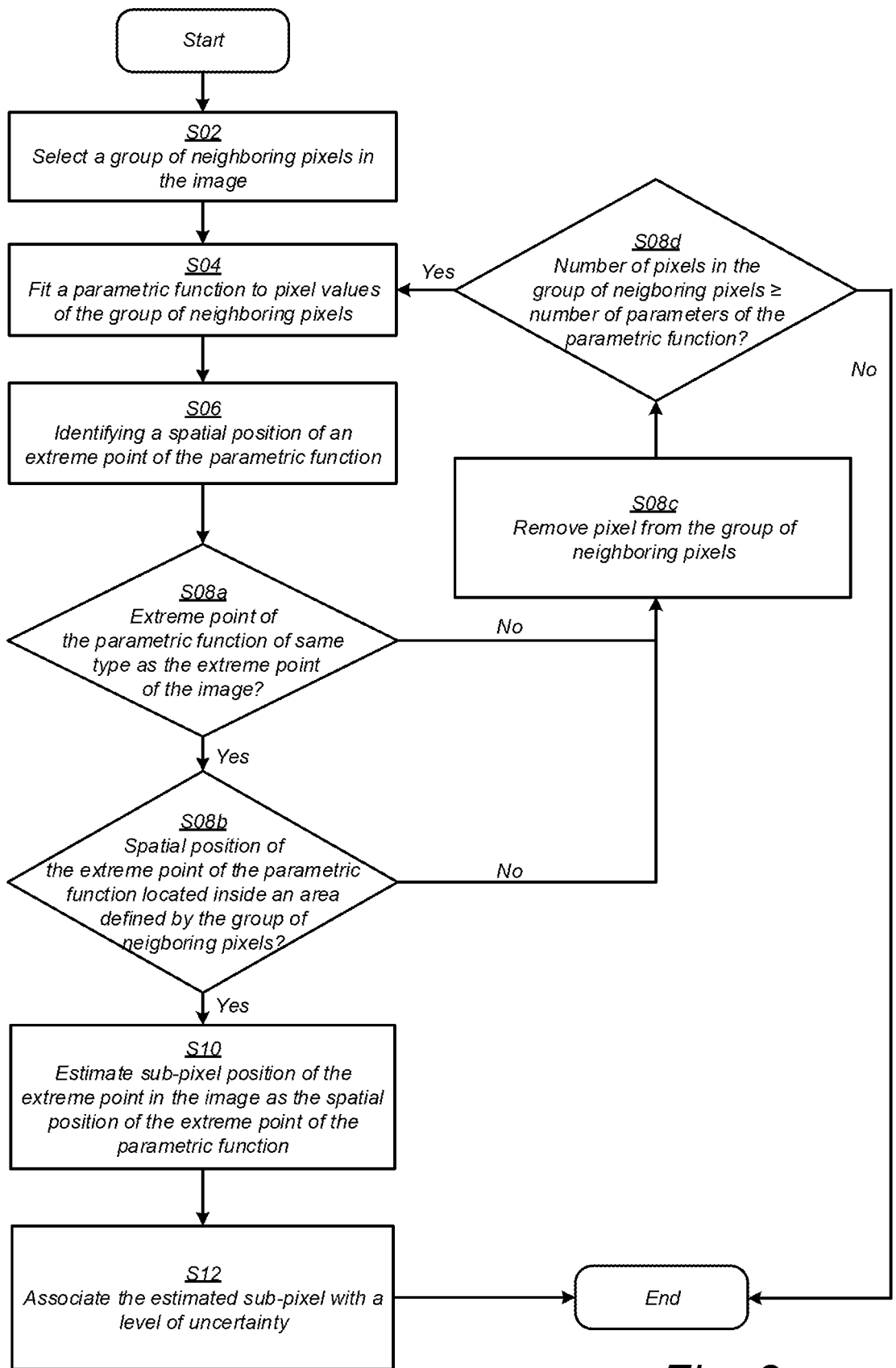
FIG. 3 is a flow chart of a method for estimating a sub-pixel position of an extreme point in an image according to embodiments.

The operation of the device 100 will be explained in more detail in the following with reference to FIG. 1, FIG. 4, and the flow chart of FIG. 3.

An image is input to the device 100. As will be explained, the device 100 processes the image to provide an estimate of a sub-pixel position of an extreme point in the image as well as a level of uncertainty of the estimate. In the following, it is assumed that the extreme point in the image is a maximum. However, it is understood that the extreme point in the image equally well can be a minimum.

Figure 4A:
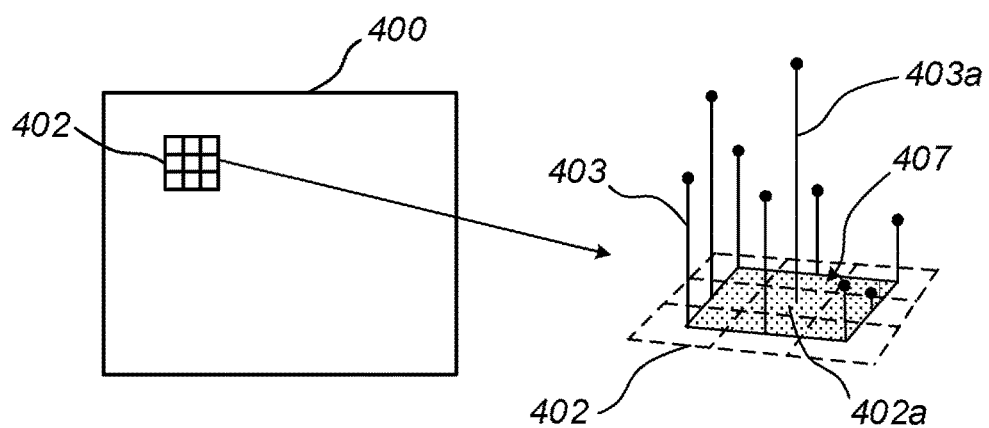
FIG. 4a illustrates a group of neighboring pixels in an image according to embodiments.

In step S02, the processor 102 selects a group of neighboring pixels in the image. This is further illustrated in FIG. 4a which illustrates an image 400 and a selected group of neighboring pixels 402. The illustrated group of neighboring pixels 402 includes 3×3 pixels, although it is understood that larger groups of neighboring pixels, such as 5×5 pixels or 7×7 pixels, may be selected. In order to select the group of neighboring pixels 402, the processor 102 may identify one or more local maxima in the image 400. A local maximum may be identified as a pixel in the image 400 having a pixel value which is larger than that of each neighboring pixel. Such a local maximum is illustrated in the right portion of FIG. 4a, showing a pixel 402a having a pixel value 403a which exceeds that of its eight neighbors. The group of neighboring pixels 402 may be selected to include the pixel identified as a local maximum. For example, the group of neighboring pixels 402 may be selected such that a center pixel of the group corresponds to the pixel 402a identified as a local maximum. In the illustrated example, the center pixel of the 3×3 pixel neighborhood 402 corresponds to the pixel 402a identified as a local maximum, and the other eight pixels corresponds to the eight neighbors of the pixel 402a identified as a local maximum. In the example, the center value of the group of neighboring pixels 402 is the largest. The assumption is that the pixel values 403 in the group of neighboring pixels 402 are measured from a peak in the image, and that the true peak coordinate is spatially located between these measurements, e.g., at a sub-pixel position within the group of neighboring pixels 402. For the following description it is, without loss of generality, assumed that the center pixel of the group 402 is located at (0,0) and that the other locations are within a range of one. However, it is understood that other assumptions are equally possible. Accordingly, the pixel positions in the group of neighboring pixels 402 are assumed to be:

| (−1, −1) | (0, −1) | (1, −1) |
| (−1, 0)  | (0, 0)  | (1, 0)  |
| (−1, 1)  | (0, 1)  | (1, 1)  |

The pixel positions in the group of neighboring pixels 402 define an area 407. The area 407 is spanned by the pixel positions of the pixels in the group. In other words, the area 407 includes all spatial positions which falls between the pixel positions of the group of neighboring pixels 402. In this case, the area 407 thus includes all spatial positions (x, y) for which |x|<1, and |y|<1.

Further, in the following description the pixel values 403 corresponding to the pixel positions in the group 402 are denoted by:

| $Z_1$ | $Z_2$ | $Z_3$ |
|---|---|---|
| $Z_4$ | $Z_5$ | $Z_6$ |
| $Z_7$ | $Z_8$ | $Z_9$ |

In case more than one local maxima are identified, the group of neighboring pixels 402 may be selected to include the pixel identified as the global maximum (i.e. having the largest pixel value in the image). Alternatively, or additionally, several groups of neighboring pixels may be selected, each group corresponding to one identified local maxima. The steps described below may then be repeated separately for each selected group of neighboring pixels.

If the extreme point in the image instead had been a minimum, the processor 102 may instead identify one or more local minima in the image 400, and select the group of neighboring pixels to include the pixel identified as a local minimum. A local minimum may be identified as a pixel in the image having a pixel value which is lower than that of each neighboring pixel.

Figure 4B:
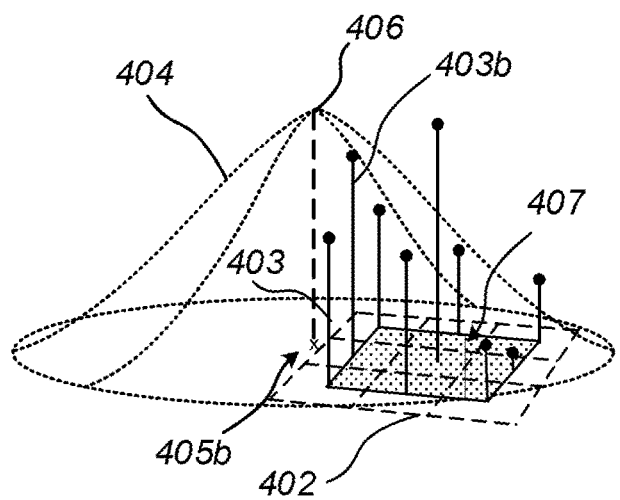
FIGS. 4b-d illustrates the fit of a parametric function to pixel values of the group of neighboring pixels shown in FIG. 4a according to embodiments.

In step S04, the processor 102 fits a parametric function to the pixel values 403 of the group of neighboring pixels 402. The fitting includes estimating parameters of the parametric function such that the resulting parametric function approximates the pixel values 403 of the group of neighboring pixels 402 as a function of spatial position as good as possible. (e.g., in a least squares sense). FIG. 4b illustrates a parametric function 404 which has been fitted to the pixel values 403 of the group of neighboring pixels 402. The parametric function may be a two-dimensional quadratic function, although other parametric functions may be used as well. Such a function may be written on the following parametric form using six parameters A, B, C, D, E, F:

$$f(x,y)=Ax^2+By^2+Cxy+Dx+Ey+F.$$

Since the two-dimensional quadratic function is described by six parameters, it may be fitted to the pixel values 403 of the group of neighboring pixels 402 as long as there are at least six pixels in the group of neighboring pixels 402.

The processor 102 may estimate the parameters of the parametric functions by solving a system of equations expressed in terms of the unknown parameters and the pixel values 403 of the group of neighboring pixels 402. For example, using all nine available samples ($z_1$, $z_2$, $z_3$, $z_4$, $z_5$, $z_6$, $z_7$, $z_8$, $z_9$) of the 3×3 group of neighboring pixels 402, and inserting into the above expression of the two-dimensional quadratic function, the following system of nine equations may be formulated:

$$A+B+C-D-E+F=z_1$$

$$B-E+F=z_2$$

$$A+B-C+D-E+F=z_3$$

$$A-D+F=z_4$$

$$F=z_5$$

$$A+D+F=z_6$$

$$A+B-C-D+E+F=z_7$$

$$B+E+F=z_8$$

$$A+B+C+D+E+F=z_9$$

This system of equations is over-determined since there are more equations than unknowns. In order to find a solution, a least squares method may be used. This includes minimizing the sum of squared differences between the pixel values 403 of the group of neighboring pixels 402 and the parametric function 404 evaluated at the positions of the pixels of the group of neighboring pixels 402. In other words, a solution, in the least squares sense, may be found by minimizing the following least squares objective:

$$\Theta(A, B, C, D, E, F) = (A + B + C - D - E + F - z_1)^2 +$$
$$(B - E + F - z_2)^2 + (A + B - C + D - E + F - z_3)^2 + (A - D + F - z_4)^2 +$$
$$(F - z_5)^2 + (A + D + F - z_6)^2 + (A + B - C - D + E + F - z_7)^2 +$$
$$(B + E + F - z_8)^2 + (A + B + C + D + E + F - z_9)^2$$

By finding the partial derivatives $$\frac{d\Theta}{dA}, \frac{d\Theta}{dB}, \frac{d\Theta}{dC}, \frac{d\Theta}{dD}, \frac{d\Theta}{dE}, \frac{d\Theta}{dF}$$

and setting each to zero leads to an equation system that can be solved explicitly. In this case the solution is:

$$A = \frac{1}{6}z_9 - \frac{1}{3}z_8 + \frac{1}{6}z_7 + \frac{1}{6}z_6 - \frac{1}{3}z_5 + \frac{1}{6}z_4 + \frac{1}{6}z_3 - \frac{1}{3}z_2 + \frac{1}{6}z_1$$

$$B = \frac{1}{6}z_9 + \frac{1}{6}z_8 + \frac{1}{6}z_7 - \frac{1}{3}z_6 - \frac{1}{3}z_5 - \frac{1}{3}z_4 + \frac{1}{6}z_3 + \frac{1}{6}z_2 + \frac{1}{6}z_1$$

$$C = \frac{1}{4}z_9 \quad - \frac{1}{4}z_7 \quad \quad - \frac{1}{4}z_3 \quad + \frac{1}{4}z_1$$

$$D = \frac{1}{6}z_9 \quad - \frac{1}{6}z_7 + \frac{1}{6}z_6 \quad - \frac{1}{6}z_4 + \frac{1}{6}z_3 \quad \frac{1}{6}z_1$$

$$E = \frac{1}{6}z_9 + \frac{1}{6}z_8 + \frac{1}{6}z_7 \quad \quad - \frac{1}{6}z_3 - \frac{1}{6}z_2 - \frac{1}{6}z_1$$

$$F = -\frac{1}{9}z_9 + \frac{2}{9}z_8 - \frac{1}{9}z_7 + \frac{2}{9}z_6 + \frac{5}{9}z_5 + \frac{2}{9}z_4 - \frac{1}{9}z_3 + \frac{2}{9}z_2 - \frac{1}{9}z_1$$

Accordingly, solving the system of equations to find the parameters includes forming linear combination of the pixel values ($z_1$, $z_2$, $z_3$, $z_4$, $z_5$, $z_6$, $z_7$, $z_8$, $z_9$) of the group of neighboring pixels 402. The coefficients of the linear combinations are preferably pre-calculated and stored in the device 100, e.g., in the memory 104.

Having fitted the parametric function 404, the processor 102 proceeds to identify a spatial position 405b (indicated by an "X" in FIG. 4b) of an extreme point 406 of the parametric function 404. By an extreme point of the parametric function 404 is meant a point where the partial derivatives $$f_x = \frac{\partial f}{\partial x} \text{ and } f_y = \frac{\partial f}{\partial y}$$

are equal to zero. In other words, by an extreme point is meant a stationary point of the parametric function 404. In case the parametric function 404 is the two-dimensional quadratic function described above, the spatial position (x*, y*) of its extreme point is equal to:

$$x^* = \frac{-(2BD - CE)}{4AB - C^2}$$

$$y^* = \frac{-(2AE - CD)}{4AB - C^2}$$

As is well known, a stationary point of a function of two variables may be a maximum, a minimum, or a saddle point. If the method aims at estimating a sub-pixel position of a maximum, it is desirable that the extreme point of the fitted parametric function also is a maximum. Similarly, if the method instead aims at estimating a sub-pixel position of a minimum, it is desirable that the extreme point of the fitted parametric function is a minimum. Therefore, in step S08*a*, the processor 102 checks whether the extreme point 406 of the parametric function 404 is of the same type as the extreme point in the image 400. In other words, if the processor 102 is aiming at estimating the sub-pixel position of a maximum in the image 400, the processor 102 in step S08*a* checks whether the spatial position 405 of the extreme point 406 of the parametric function 404 is a maximum or not. This check is referred to herein as a maximum check.

Finding a maximum of a function is where the derivative is zero and when $f_{xx}f_{yy} - f_{xy}^2 > 0$, $f_{xx} < 0$, and $f_{yy} < 0$. Here $$f_{xx} = \frac{\partial^2 f}{\partial x^2}, f_{yy} = \frac{\partial^2 f}{\partial y^2}, f_{xy} = \frac{\partial^2 f}{\partial x \partial y}.$$

For the two-dimensional quadratic function $f_{xx} = 2A$, $f_{xx} = 2B$, and $f_{xy} = C$. Hence for the two-dimensional quadratic function, the processor 102 may check if the extreme point 406 is a maximum by checking the following condition:

$4AB - C^2 > 0$ $2A < 0$ $2B < 0$

The corresponding conditions for a minimum is $f_{xx}f_{yy} - f_{xy}^2 < 0$, $f_{xx} < 0$, and $f_{yy} > 0$, which for the two-dimensional quadratic function becomes:

$4AB - C^2 < 0$ $2A > 0$ $2B > 0$

In the example of FIG. 4*b*, the processor 102 finds that the extreme point 406 is a maximum, and hence of the same type as the extreme point in the image 400. In cases where the parametric function 404 may have several local extreme points, the processor may also check whether the extreme point 406 is the single global extreme point of the parametric function being of the same type as the extreme point in the image.

The processor 102 also checks, in step S08*b*, whether the spatial position 405*b* of the extreme point 406 of the parametric function 404 is located inside or outside of the area 407 defined by the pixel positions of the group of neighboring pixels 402 in the image 400. This check is referred to herein as a localization check. It is understood that steps S08*a* and S08*b* can be made in any order. Using the coordinate system in the range [−1, 1] for the group of neighboring pixels 402 as introduced above, the processor 102 may hence check whether the conditions |x*|<1, |y*|<1 are satisfied.

If both the maximum check of step S08*a*, and the localization check of step S08*b* passes (i.e., if the extreme point 406 of the parametric function 404 is of the same type as the extreme point in the image 400, and the spatial position 405*b* of the extreme point 406 of the parametric function 404 is located inside the area 407), then the processor 102 proceeds to step S10.

However, if any of the maximum check of step S08*a*, and the localization check of step S08*b* fails, (i.e., if the extreme point 406 of the parametric function 404 is of a different type than the extreme point in the image 400, and/or the spatial position 405*b* of the extreme point 406 of the parametric function 404 is located outside of the area 407), the processor 102 instead proceeds to step S08*c*. This is the case in the example of FIG. 4*b*, since the spatial position 405*b* of the extreme point 406 is located outside of the area 407 hence failing the localization check. In cases where it is found that the extreme point 406 of the parametric function 404 is not the single global maximum (or minimum), the processor 102 may also proceed to step S08*c*.

In step S08*c*, the processor 102 removes a pixel from the group of neighboring pixels. The idea behind the removal is to remove an outlier and to make a new attempt to fit a parametric function. There are many ways of identifying a pixel having an outlying value. For example, the processor 102 may remove the pixel having a pixel value which deviates most from an average formed from the pixel values of the group of neighboring pixels. When forming the average, the pixel value $z_5$ at the center of the group of neighboring pixels 402 may be omitted. More specifically, consider the array k=[1, 2, 3, 4, 6, 7, 8, 9] of length K=8 to be possible indices of the pixel values z to remove an outlier from. Then the k*(i) found from $$\underset{k^*(i)}{\mathrm{argmax}} \left\| z_{k(i)} - \frac{1}{K}\sum_{i=1}^{K} z_{k(i)} \right\|$$

will be the pixel to remove from the group of neighboring pixels 402.

If this is applied to the example of FIG. 4*b*, the processor would arrive at k*(i)=4 and would hence proceed to remove the pixel value $z_4$, corresponding to the pixel value with number 403*b* in FIG. 4*b*. The processor 102 may further update the array for the next iteration by removing the index k*(i) from the array. Thus, with k*(i)=4 the new array would be k=[1, 2, 3, 6, 7, 8, 9] of length K=7.

In step S08*c*, the processor 102 then checks whether the number of remaining pixels in the group of neighboring pixels 402 is still larger than, or equal to, the number of parameters defining the parametric function 404.

If this condition is not met, the method terminates since it is not possible to fit the parametric function. In that case, the method may output the coordinate of the center pixel of the group of neighboring pixels 400 as the estimate of the sub-pixel position of the extreme point, i.e., the coordinate (0, 0) in the example. The associated level of uncertainty of the estimated sub-pixel position may then be set to correspond to the number of iterations of steps S04, S06, S08*a-d* plus one.

However, if the condition is met, the processor 102 proceeds to repeat steps S04, S06, and S08*a-d* as described above.

In the example of FIG. 4*b*, the number of remaining pixels after removal of pixel 403*c* is equal to eight. It is therefore possible to fit the two-dimensional quadratic function which has six parameters. The processor 102 therefore proceeds to repeat steps S08*a-d* a second time, although this time with the pixel value 403*b* removed. This implies that one equation in the systems of equations will be removed, the equation including $z_{k^*(i)}$. For example, with k*(i)=4, the least squares objective to minimize now becomes:

$$\Theta(A, B, C, D, E, F) = (A+B+C-D-E+F-z_1)^2 +$$
$$(B-E+F-z_2)^2 + (A+B-C+D-E+F-z_3)^2 + (F-z_5)^2 +$$
$$(A+D+F-z_6)^2 + (A+B-C-D+E+F-z_7)^2 +$$
$$(B+E+F-z_8)^2 + (A+B+C+D+E+F-z_9)^2$$

Again the system of equations can be explicitly solved with the same methodology as previously described. At this stage, with one pixel removed, there are eight pixels left in the group of neighboring pixels 402. Hence, there are $$\binom{8}{1} = 8$$

possible systems or equations to solve depending on which pixel was removed. Preferably, the solution of each of these eight possible systems of equations are pre-stored in the device 100.

Figure 4C:
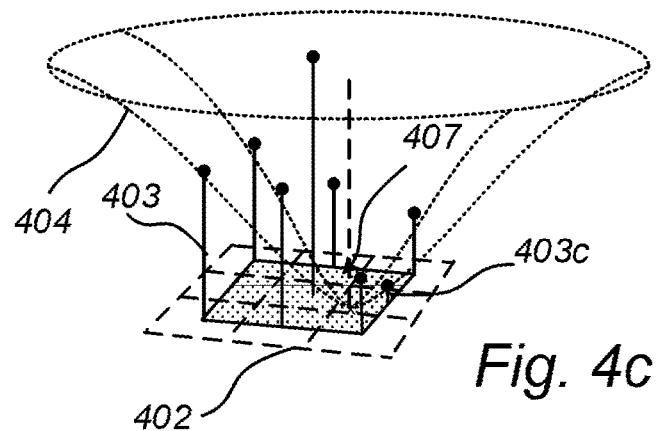

The result of the second fit of a parametric function 404 is shown in FIG. 4*c*. As is evident from that figure, the parametric function 404 has an extreme point which is a minimum. Accordingly, the maximum check of step S08*a* fails, and the processor 102 will once again proceed to step S08*c* to remove a pixel from the group of neighboring pixels 402 as described above. This time the pixel with pixel value $z_6$, corresponding to reference number 403*c* in FIG. 4*c*, is removed from the group. After the removal, there are seven pixels left in the group of neighboring pixels. Since the number of pixels left in the group is still larger than the number of parameters of the parametric function the condition of step S08*d* is complied with. The processor 102 hence proceeds to step S04 again and fits a parametric function to the pixel values of the group of neighboring pixels 402 for a third time by solving a system of equations. At this stage, with two pixels removed, there are $$\binom{8}{2} = 28$$

possible systems of equations to solve depending on which pixels were removed. Again, the solutions to these 28 system of equations are preferably pre-stored in the device 100. If the method were to remove a further pixel, there would in the next stage of fitting be $$\binom{8}{3} = 56$$

possible systems of equations, the solutions to which are preferably pre-stored in the device 100. Accordingly, in this example the device 100 preferably pre-stores solutions to 1+8+28+56=93 systems of equations.

Figure 4D:
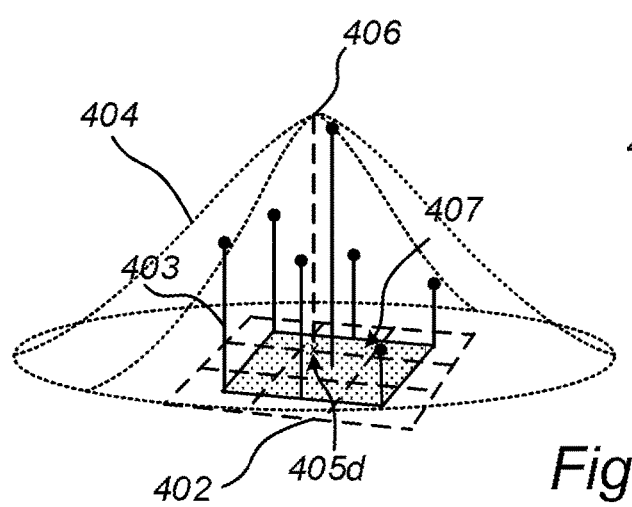

The result of the third fit of a parametric function 404 is shown in FIG. 4*d*. This time, the extreme point 406 is a maximum, i.e., it is of the same type as the extreme point in the image 400. Further, the spatial position 405*d* of the extreme point 406 of the parametric function 404 is located inside the area 407. Hence both the maximum check of step S08*a*, and the localization check of step S08*b* pass. As a consequence, the processor 102 proceeds to step S10.

In step S10, the processor 102 estimates the sub-pixel position of the extreme point in the image 400 as the spatial position 405*d* of the parametric function 404 from the last iteration. Further, in step S12, the processor 102 associates the estimated sub-pixel position with a level of uncertainty corresponding to the number of iterations of steps S04, S06, and S08*a-b*. In the example of FIGS. 4*a-d*, the level of uncertainty associated with the estimated sub-pixel position will hence be equal to three, since three iterations were required before the estimated sub-pixel position was found.

The estimated sub-pixel position and the associated level of uncertainty or the estimated sub-pixel position may be output of the device 100. Typically, however, the estimated sub-pixel position and the associated level of uncertainty may be stored in a memory of the device for further processing. The processing of the estimated sub-pixel position may vary depending on the application at hand. However, common for the applications is that the processor 102 may use the level of uncertainty associated with the estimate as a weight during the processing. In particular, a higher level of uncertainty may correspond to a lower weight than a lower level of uncertainty.

A particular application of the above method is to stereo images. In particular, as explained above in conjunction to FIG. 2, the device 100 may be used in a stereo camera system 200 to estimate the sub-pixel position of an extreme point in a correlation map. The operation of the system 200 will now be explained in more detail with reference to FIG. 2 and FIG. 5.

The first image sensor 202 captures a first image 203, and the second image sensor 204 captures a second image 205. The first and second image 203, 205 forms a stereo pair of images. The stereo pair of images 203, 205 are input to the matching component 206. The matching component 206 matches pixel values in the first image 203 to pixel values in the second image 205. Any known local stereo matching algorithm such as algorithms using sum of squared differences, sum of absolute differences, or normalized cross-correlation may be used for the matching. Common to these algorithms is that they compare a portion in the first image 203 to different portions in the second image 205, and determine how similar the portion of the first image 203 is to the different portions of the second image 205. The portion in the first image 203 may be a neighborhood of a pixel in the first image 203. The portions in the second image 205 may be neighborhoods of different pixels in the second image 205. The different pixels in the second image 205 may include all pixels in the second image 205, or a subset of pixels in the second image 205. By a neighborhood of a pixel is here meant the pixel itself and one or more pixels surrounding the pixel in the image. The matching component 206 may store the result of the match in a correlation map 207. The correlation map 207 thus includes correlation values which specify how well each portion in the second image 205 matches a particular portion in the first image 203. In particular, the correlation map 207 may include correlation values for each pixel or a subset of the pixels in the second image 205. Each correlation value indicates how well a neighborhood of the pixel in the second image 205 matches with a neighborhood of a particular pixel in the first image 203.

Figure 5:
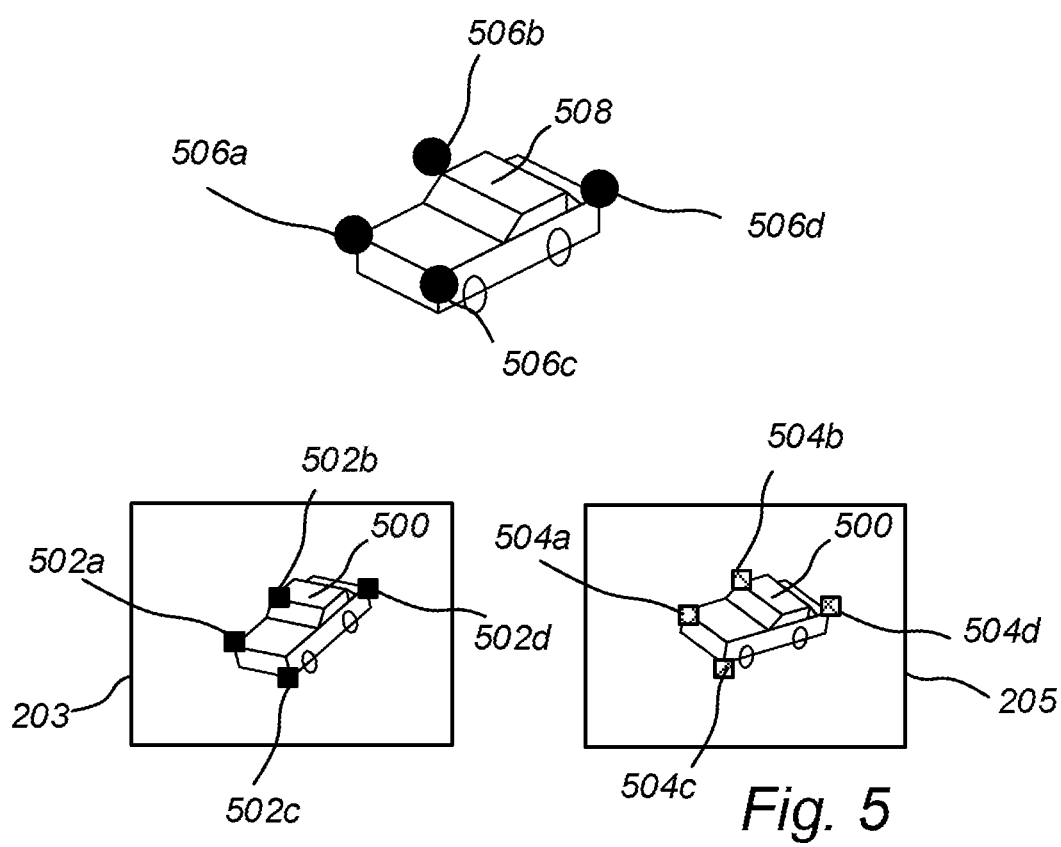
FIG. 5 schematically illustrates a pair of stereo images depicting an object in a scene according to embodiments.

The matching component 206 may generate such a correlation map 207 for one or more pixels 502a, 502b, 502c, 502d in the first image 203. The one or more pixels 502a, 502b, 502c, 502d in the first image 203 may correspond to a specified area in the first image 203. For example, the one or more pixels 502a, 502b, 502c, 502d in the first image 203 may be a group of neighboring pixels in the first image 203. In some applications, the one or more pixels 502a, 502b, 502c, 502d in the first image 203 may depict the same object in the scene. This is the case in the example of FIG. 5. In FIG. 5, the first image 203 and the second image 205 depict an object 500 in the scene, here in the form of a car. Here, the one or more pixels 502a, 502b, 502c, 502d in the first image 203 each depict the car. The matching component 206 may generate a correlation map 207 for each of the one or more pixels 502a, 502b, 502c, 502d which depict the object 500 as explained above. Accordingly, each of the one or more pixels 502a, 502b, 502c, 502d is associated with a respective correlation map 207.

The correlation map 207 corresponding to each of the one or more pixels 502a, 502b, 502c, 502d in the first image 203 may be provided as input to the device 100. Accordingly, the image 400 described in conjunction to FIG. 4a will in this case be a correlation map 207. The device 100 processes each correlation map 207 in accordance with the method described with respect to FIG. 3. Consequently, the device 100 estimates a sub-pixel position of a maximum in each correlation map 207, as well as a level of uncertainty of the estimated sub-pixel position. In other words, the device 100 estimates, for each of the one or more pixels in the first image 203, a sub-pixel position in the second image 205 that gives a best match to the pixel. Turning to the example of FIG. 5, a sub-pixel position 504a, 504b, 504c, 504d is estimated for each of the one or more pixels 502a, 502b, 502c, 502d. The associated level of uncertainty of the sub-pixel positions 504a, 504b, 504c, 504d is in this example assumed to be 1, 3, 2, 1, respectively.

The processor 102 of device 100 may then proceed to process the estimated sub-pixel positions 504a, 504b, 504c, 504d corresponding to the one or more pixels 502a, 502b, 502c, 502d. During the processing, the processor 102 may use the level of uncertainty associated with the sub-pixel positions 504a, 504b, 504c, 504d to weight the sub-pixel positions or any quantity calculated from the sub-pixel positions. The processor 102 will give higher weight to more certain estimates than to less certain estimates. In the example of FIG. 5, the sub-pixel positions 504a and 504d (with level of uncertainty=1), or any quantity derived therefrom, will be given a higher weight than the sub-pixel position 504c (with level of uncertainty=2), or any quantity derived therefrom. The sub-pixel position 504c, or any quantity derived therefrom, will in turn be given a higher weight than the sub-pixel position 504d (with level of uncertainty=3), or any quantity derived therefrom.

According to an example, the quantity derived from the estimated sub-pixel positions 504a, 504b, 504c, 504d are disparity values. More specifically, the processor 102 may calculate a disparity values for each of the one or more pixels 502a, 502b, 502c, 502d. A disparity value is calculated as the difference between the position of the one of the pixels 502a, 502b, 504c, 504d in the first image 203 and the corresponding sub-pixel position 504a, 504b, 504c, 504d in the second image 205. Each disparity value may be associated with the level of uncertainty of the sub-pixel position used when calculating the disparity value. The processor 102 may then smooth the calculated disparity values. This may include calculating a weighted average of the disparity values. When calculating the weighted average, a disparity value being associated with a higher level of uncertainty is given a lower weight than a disparity value being associated with a lower level of uncertainty.

According to an example, the quantity derived from the estimated sub-pixel positions 504a, 504b, 504c, 504d are depth values. In more detail, the processor 102 may calculate a depth value for each of the one or more pixels 502a, 502b, 502c, 502d. As is known in the art, a depth value may be calculated from a point correspondence between two stereo images when the distance between the image sensors and the focal length are known. In more detail, the depth may be calculated as the product of the focal length and the distance between the sensors divided by the disparity. The processor 102 may associate each depth value with the level of uncertainty of the sub-pixel position used when calculating the depth value. The processor 120 may smooth the calculated depth values. This may include calculating a weighted average of the depth values. When calculating the weighted average, a depth value being associated with a higher level of uncertainty is given a lower weight than a depth value being associated with a lower level of uncertainty.

When the one or more pixels 502a, 502b, 502c, 502d correspond to all pixels of the first image 203, the calculated depth values may be said to form a depth map. This depth map may be smoothed using a spatial filter. The coefficients of the spatial filter correspond to the above weights, and may be set using the level of uncertainty associated with the depth values.

When the one or more pixels 502a, 502b, 502c, 502d correspond to a specified area of the first image 203, a weighted area of the depth for that specified area may be calculated.

According to an example, the quantity derived from the estimated sub-pixel positions 504a, 504b, 504c, 504d are points in three-dimensional space. More specifically, the processor 102 may use the one or more pixels 502a, 502b, 502c, 502d in the first image 203 and the corresponding sub-pixel positions 504a, 504b, 504c, 504d in the second image 205 to calculate points 506a, 506b, 506c, 506d in three-dimensional space corresponding to the one or more pixels 502a, 502b, 502c, 502d. As is known in the art, coordinates of a point in three-dimensional space corresponding to a pixel in the first image 203 may be calculated from the position and the depth value of the pixel. The processor 102 may further associate each of the calculated points 506a, 506b, 506c, 506d with the level of uncertainty of the sub-pixel position used when calculating the coordinates of the point. If the one or more pixels 502a, 502b, 502c, 502d depict the same object 500, the calculated points 506a, 506b, 506c, 506d will be estimates of points on the object 500 in the scene.

The processor 102, may process the points 506a, 506b, 506c, 506d. During the processing, the processor 102 may use the associated level of uncertainty of the points 506a, 506b, 506c, 506d to weight the points. A point having a higher level of uncertainty will be given a lower weight than a point having a lower level of uncertainty. As illustrated in FIG. 5, the processing of the points 506a, 506b, 506c, 506d may include fitting an object template 508 to the points 506a, 506b, 506c, 506d. The object template 508 defines an outline of an object of the same type as the true object 500 in the scene. In this case, the object template 508 defines the outline of a car. However, in other applications, the object template 508 may be a geometrical plane, a person, or any other kind of object. When fitting the object template 508, the processor 102 may give the points 506a, 506b, 506c, 506d different weights. The weights may be set to depend on the level of uncertainty associated with the points 506a, 506b, 506c, 506d such that a higher level uncertainty results in a lower weight and vice versa. For example, the object template 508 may be fitted to the points 506a, 506b, 506c, 506d using a weighted least squares approach, where a weighted sum of the squared distances between the points 506a, 506b, 506c, 506d and the object template 508 is minimized. The terms in the sum may be weighted such that a term corresponding to a point having a higher level of uncertainty is given a lower weight than a term corresponding to a point having a lower level of uncertainty.

It will be appreciated that a person skilled in the art can modify the above-described embodiments in many ways and still use the advantages as shown in the embodiments above. Thus, the teachings should not be limited to the shown embodiments but should only be defined by the appended claims. Additionally, as the skilled person understands, the shown embodiments may be combined.

The invention claimed is:

1. A method, performed in a device, for estimating a sub-pixel position of an extreme point in an image in the presence of noise using a parametric function, the extreme point in the image being of a type which is either a maximum or a minimum, the method comprising:
   a) selecting a group of neighboring pixels in the image, wherein a number of pixels in the group of neighboring pixels is larger than a number of parameters defining the parametric function,
   b) fitting the parametric function to pixel values of the group of neighboring pixels, wherein the parametric function approximates the pixel values of the group of neighboring pixels as a function of spatial position,
   c) identifying a spatial position of an extreme point of the parametric function, the extreme point of the parametric function being of a type which is a maximum, a minimum, or a saddle point,
   d) determining whether the extreme point of the parametric function is of the same or a different type than the extreme point in the image, and whether the position of the extreme point of the parametric function is located inside or outside of an area defined by pixel positions of the group of neighboring pixels in the image, and
   if the extreme point of the parametric function is of a different type than the extreme point in the image or the position of the extreme point of the parametric function is located outside said area:
      removing a pixel from the group of neighboring pixels, and
      repeating steps b), c) and d) if the number of pixels in the group of neighboring pixels is still larger than, or equal to, the number of parameters defining the parametric function,
   e) estimating the sub-pixel position of the extreme point in the image as the spatial position of the extreme point of the parametric function, and
   f) associating the estimated sub-pixel position with a level of uncertainty corresponding to a number of iterations of steps b), c) and d).

2. The method of claim 1, wherein
   if the extreme point in the image is a maximum, the group of neighboring pixels is selected to include a pixel in the image having a pixel value which is greater than a pixel value of each neighboring pixel in the image, and
   if the extreme point in the image is a minimum, the group of neighboring pixels is selected to include a pixel in the image having a pixel value which is lower than a pixel value of each neighboring pixel in the image.

3. The method of claim 1, wherein step b) involves solving a system of equations to find the parameters defining the parametric function, wherein solving the system of equations includes forming linear combinations of pixel values of the group of neighboring pixels to find the parameters defining the parametric function, wherein coefficients of the linear combinations are pre-stored in the device.

4. The method of claim 1, further comprising:
   processing the estimated sub-pixel position, wherein the level of uncertainty associated with the estimated sub-pixel position is used to weight the estimated sub-pixel position during the processing, wherein a higher level of uncertainty corresponds to a lower weight than a lower level of uncertainty.

5. The method of claim 1, wherein the image corresponds to a correlation map generated by matching pixel values in a neighborhood of a pixel in a first image of a stereo pair of images with pixel values in a second image of the stereo pair of images, such that the estimated sub-pixel position of the extreme point in the image corresponds to a sub-pixel position in the second image that gives a best match to the pixel in the first image.

6. The method of claim 5, further comprising, for each of a plurality of pixels in the first image of the stereo pair of images:
   generating a correlation map corresponding to the pixel by matching pixel values in a neighborhood of the pixel with pixel values in the second image,
   performing steps a)-f) for the correlation map corresponding to the pixel so as to estimate a sub-pixel position in the second image that gives a best match to the pixel, the sub-pixel position in the second image being associated with a level of uncertainty.

7. The method of claim 6, further comprising:
   processing the estimated sub-pixel positions corresponding to the plurality of pixels in the first image of the stereo pair of images, wherein the level of uncertainty associated with the estimated sub-pixel positions are used as weights during the processing, wherein a quantity calculated from a sub-pixel position associated with a higher level of uncertainty is given a lower weight than a quantity calculated from a sub-pixel position associated with a lower level of uncertainty.

8. The method of claim 7, wherein the quantity calculated from a sub-pixel position includes a disparity value which is calculated as a difference between the sub-pixel position and a position of a corresponding pixel in the first image.

9. The method of claim 7, wherein the quantity calculated from a sub-pixel position includes a depth value which is calculated based on the sub-pixel position and a position of a corresponding pixel in the first image, wherein the depth value corresponds to a distance to an object in the scene depicted by the pixel in the first image.

10. The method of claim 9, wherein the processing further includes:
    calculating a weighted average of depth values corresponding to the plurality of pixels in the first image of the stereo pair of images, wherein depth values calculated from sub-pixel positions having a higher level of uncertainty are given a lower weight than depth values calculated from sub-pixel positions having a lower level of uncertainty.

11. The method of claim 8, wherein the quantity calculated from a sub-pixel position includes a point in three-dimensional space, wherein the point in three-dimensional space is calculated based on the sub-pixel position and a position of a corresponding pixel in the first image.

12. The method of claim 11, wherein the plurality of pixels in the first image of the stereo pair of images depict the same object in the scene, the processing further comprising:
calculating a plurality of points in three-dimensional space corresponding to the plurality of pixels in the first image of the stereo pair of images, each point in three-dimensional space being calculated using the position of the corresponding pixel in the first image and the sub-pixel position in the second image that gives a best match to the pixel in the first image,
fitting a three-dimensional object template to the plurality of points in three-dimensional space, the three-dimensional object template defining an outline of an object being of the same type as the object in the scene,
wherein, in the step of fitting the three-dimensional object template, a point in three-dimensional space calculated from a sub-pixel position with a higher level of uncertainty is given a lower weight than a point in three-dimensional space calculated from a sub-pixel position with a lower level of uncertainty.

13. A device for estimating a sub-pixel position of an extreme point in an image in the presence of noise using a parametric function, the extreme point in the image being of a type which is either a maximum or a minimum, the device comprising a processor configured to:
a) select a group of neighboring pixels in the image, wherein a number of pixels in the group of neighboring pixels is larger than a number of parameters defining the parametric function,
b) fit the parametric function to pixel values of the group of neighboring pixels,
c) identify a position of an extreme point of the parametric function, the extreme point of the parametric function being of a type which is a maximum, a minimum, or a saddle point,
d) check whether the extreme point of the parametric function is of the same or a different type than the extreme point in the image, and whether the position of the extreme point of the parametric function is located inside or outside of an area defined by pixel positions of the group of neighboring pixels in the image, and
if the extreme point of the parametric function is of a different type than the extreme point in the image or the position of the extreme point of the parametric function is located outside said area:
removing a pixel from the group of neighboring pixels, and
repeating steps b), c) and d) if the number of pixels in the group of neighboring pixels is still larger than, or equal to, the number of parameters defining the parametric function,
e) estimate the sub-pixel position of the extreme point in the image as the position of the extreme point of the parametric function, and
f) associate the estimated sub-pixel position with a level of uncertainty corresponding to a number of iterations of steps b), c) and d).

14. A stereo camera system comprising:
a first image sensor configured to capture a first image of a stereo pair of images,
a second image sensor configured to capture a second image of the stereo pair of images, and
a processor for estimating a sub-pixel position of an extreme point in an image in the presence of noise using a parametric function, the extreme point in the image being of a type which is either a maximum or a minimum, the processor configured to:
generate a correlation map from the stereo pair of images by matching pixel values in a neighborhood of a pixel in the first image with pixel values in the second image of the stereo pair of images, and
based on the correlation map estimate a sub-pixel position of an extreme point in the correlation map in the presence of noise using a parametric function by:
a) selecting a group of neighboring pixels in the correlation map, wherein a number of pixels in the group of neighboring pixels is larger than a number of parameters defining the parametric function,
b) fitting the parametric function to pixel values of the group of neighboring pixels,
c) identifying a position of an extreme point of the parametric function, the extreme point of the parametric function being of a type which is a maximum, a minimum, or a saddle point,
d) determining whether the extreme point of the parametric function is of the same or a different type than the extreme point in the correlation map, and whether the position of the extreme point of the parametric function is located inside or outside of an area defined by pixel positions of the group of neighboring pixels in the image, and
if the extreme point of the parametric function is of a different type than the extreme point in the image or the position of the extreme point of the parametric function is located outside said area:
removing a pixel from the group of neighboring pixels, and
repeating steps b), c) and d) if the number of pixels in the group of neighboring pixels is still larger than, or equal to, the number of parameters defining the parametric function,
e) estimating the sub-pixel position of the extreme point in the correlation map as the position of the extreme point of the parametric function, and
f) associating the estimated sub-pixel position with a level of uncertainty corresponding to a number of iterations of steps b), c) and d).

15. A non-transitory computer-readable medium comprising computer code instructions adapted to perform the following method for estimating a sub-pixel position of an extreme point in an image in the presence of noise using a parametric function, the extreme point in the image being of a type which is either a maximum or a minimum when executed by a device having processing capability: the method comprising:
a) selecting a group of neighboring pixels in the image, wherein a number of pixels in the group of neighboring pixels is larger than a number of parameters defining the parametric function,
b) fitting the parametric function to pixel values of the group of neighboring pixels, wherein the parametric function approximates the pixel values of the group of neighboring pixels as a function of spatial position,
c) identifying a spatial position of an extreme point of the parametric function, the extreme point of the parametric function being of a type which is a maximum, a minimum, or a saddle point, d) determining whether the extreme point of the parametric function is of the same or a different type than the extreme point in the image, and whether the position of the extreme point of the parametric function is located inside or outside of an area defined by pixel positions of the group of neighboring pixels in the image, and if the extreme point of the parametric function is of a different type than the extreme point in the image or the position of the extreme point of the parametric function is located outside said area:

removing a pixel from the group of neighboring pixels, and repeating steps b), c) and d) if the number of pixels in the group of neighboring pixels is still larger than, or equal to, the number of parameters defining the parametric function, e) estimating the sub-pixel position of the extreme point in the image as the spatial position of the extreme point of the parametric function, and f) associating the estimated sub-pixel position with a level of uncertainty corresponding to a number of iterations of steps b), c) and d).

\* \* \* \* \*